(12) United States Patent
Maschwitz

(10) Patent No.: US 6,630,284 B1
(45) Date of Patent: Oct. 7, 2003

(54) LOW REFLECTION COMPOSITE IN TRANSPARENT MATRIX

(75) Inventor: Peter A. Maschwitz, Sebastopol, CA (US)

(73) Assignee: CPFilms Inc., Martinsville, VA (US)

( * ) Notice: Subject to any disclaimer, the term of this patent is extended or adjusted under 35 U.S.C. 154(b) by 0 days.

(21) Appl. No.: 09/926,419

(22) PCT Filed: May 10, 2000

(86) PCT No.: PCT/US00/06709

§ 371 (c)(1),
(2), (4) Date: Oct. 30, 2001

(87) PCT Pub. No.: WO00/70373

PCT Pub. Date: Nov. 23, 2000

Related U.S. Application Data

(60) Provisional application No. 60/133,871, filed on May 12, 1999.

(51) Int. Cl.[7] .............................. G03C 1/76; B22B 9/00; B32B 27/36; B32B 15/08; B32B 27/00
(52) U.S. Cl. ................. 430/271.1; 428/412; 428/423.1; 428/448; 428/458; 428/463; 428/469; 428/500
(58) Field of Search ....................... 430/271.1; 428/412, 428/423.1, 448, 458, 463, 469, 500

(56) References Cited

U.S. PATENT DOCUMENTS

| | | |
|---|---|---|
| 4,786,563 A | 11/1988 | Gillery |
| 4,902,580 A | 2/1990 | Gillery |
| 4,948,677 A | 8/1990 | Gillery |
| 5,270,517 A | 12/1993 | Finley |
| 5,318,830 A | 6/1994 | Takamatsu |
| 5,342,681 A * | 8/1994 | Sulzbach ............... 428/310.5 |
| 5,698,352 A * | 12/1997 | Ogawa et al. ............... 430/14 |

* cited by examiner

*Primary Examiner*—Rosemary Ashton
(74) *Attorney, Agent, or Firm*—Bacon & Thomas

(57) ABSTRACT

A thin film composite material is disclosed which includes an antireflection layer (6) interposed between a metal layer (2) and a transparent layer (1). The antireflection layer (6) reduces reflection of light by the metal layer (2) when light reaches the metal layer (2) after passing through the transparent layer (1) and the antireflection layer (6). The antireflection layer (6) has an index of refraction greater than 2.5 and an extinction coefficient which is less than 0.5 at 600–1200 nm wavelengths. Suitable materials for the antireflection layer (6) include oxides of copper (especially cuprous oxide), Iran II oxide and SiC. The antireflection layer (6) is advantageously applied so that it has an optical thickness of one quarter wavelength with respect to the wavelength of the light which is to be antireflected. The metal layer (2) is made from a gray low reflectance type metal such as Ti, Zr, Hf, Cr, Mo, W, Ni, Pd, or Pt or alloys of these metals.

18 Claims, 1 Drawing Sheet

LOW REFLECTION COMPOSITE IN TRANSPARENT MATRIX

BACKGROUND OF THE INVENTION

1. Field of the Invention

This invention pertains to thin film composite materials which include a metal layer interposed between a transparent film or coating and another film or coating. More particularly the invention pertains to the above composite films which are de signed to allow light from a laser (e.g., solid state laser) to interact with a metal film contained therein after passage of the light through one of the films or coatings in contact with the metal layer.

2. Background Information

A variety of thin film composite structures are currently available which are designed to interact with laser energy from solid state lasers. Typically these composite structures include a metal layer sandwiched between two thin film layers, at least one of which is transparent to the laser light so that the laser light can readily pass therethrough and interact with the metal layer within the composite. Such composite films are well known and are sold to a variety of industries for different applications. Thus such composite film structures may include additional layers, materials and may have particular structural features depending upon the specific end use application. However, they all share the above-described composite as a common feature, i.e., they all contain the metal layer in contact on one side thereof with a layer which is transparent to the laser light and another layer which need not be transparent to the laser light on the other side thereof.

Composite films which share the above-described common feature are used as imaging media and may find utility as printing plates, photo masks, dye transfer films, etc. The images are formed by selectively ablating away portions of a semitransparent metal layer located within the composite through the use of light energy such as laser light. In these applications it is desirable to maximize light energy coupling to the metal layer to allow use of lower output and less costly lasers.

As noted above, light must first pass through a transparent layer before it can reach the metal and interact therewith. However, the metal, such as titanium which is frequently used as the ablated metal in such composite films, is capable of reflecting at least a portion of the incident light and thus undesirable reflection of light will occur at the transparent layer/metal interface. Such reflection at the transparent layer/metal interface is undesirable because it reduces the amount of available light needed for interaction with the metal. Thus, it is highly desirable to reduce the amount of light which is reflected at the metal/transparent layer interface.

Various types of antireflection coatings are available for antiflecting a metal layer (i.e., for reducing the reflection of light therefrom). However, it is extremely difficult to antireflect a metal layer which is imbedded in a composite matrix because the metal is not in direct contact with the air. In other words, the transparent layer through which the light passes before impinging on the surface of the metal, reduces the types of materials which can be used as an antireflecting layer on the metal. Thus, a simple antireflecting coating on the metal within the composite would be highly desirable particularly if the desired antireflecting. coating or layer is inexpensive and easy to apply on the metal. It would be, especially desirable to achieve the desired antireflection through the use of a single antireflection layer on the metal within the composite.

SUMMARY OF THE INVENTION

It is an objective of the present invention to reduce the amount of light reflected by metal at the metal/transparent interface of a thin film composite.

This and other objectives are achieved by applying an antireflection coating of material having an index of refraction greater than 2.5 and an extinction coefficient which is less than 0.5 at 600–1200 nm wavelengths. Preferably the antireflection layer is a coating of an inorganic compound selected from the group consisting of an oxide of copper, ferric oxide ($Fe_2O_3$) and silicon carbide (SiC) on the metal which is to be antireflected. Preferably the antireflective coating is a single layer. The preferred material for the antireflection coating is cuprous oxide.

The present invention is applicable to any of the known composite film structures described above which include a metal layer therein. Typically such composite film structures include a transparent layer such as a transparent polymer adhered to one surface of a metal layer and another layer such as a polymeric layer which need not be transparent, adhered to the other side of the metal layer. The invention is also applicable to any film assembly which contains a transparent film or coating adhered to a metal layer wherein the assembly is used as a subcomponent of a structure in which it is desired to antireflect light at the transparent film/metal interface. Various manufacturing methods are known for producing such polymer/metal/polymer thin film composite structures. For example, the metal may be coated by any known process (e.g., sputtering, thermal evaporation, electron beam evaporation, etc.) onto the surface of one film to produce a metal/film structure. Then the exposed metal surface of the metal/film structure may be coated to form a film thereon by any known method. Preferably each film adhered to the metal is a polymeric film such as the numerous polymeric films currently used for composite film structures.

In order to practice this invention it is only necessary to modify the known methods of making the aforementioned composite films by further including an antireflecting coating on the metal so that the light which enters the composite film first passes through the transparent layer and then passes through the antireflecting layer which is in contact with the metal. Interposing an antireflecting layer between the transparent layer and the metal layer reduces the amount of light which is reflected by the metal and thereby increases the amount of available light for interaction with the metal.

As noted above, although it is known to apply an antireflecting layer on a layer which is to be antireflected, such layers are placed on the top of the structure (i.e., on the surface thereof) so that light enters the structure by first passing through the antireflecting layer, not by first passing through a transparent film such as a transparent polymeric layer. The use of such prior art antireflecting layers within the composite structure, as opposed to the use of an antireflecting coating on the surface of the structure, will not produce the desired antireflection of the metal layer located within the composite. Without being bound to any particular theory, it is believed that the materials used in prior art antireflecting layers are inadequate to antireflect the metal located beneath a transparent film due to an inadequate index of refraction of such prior art antireflection materials.

DETAILED DESCRIPTION OF THE INVENTION AND PREFERRED EMBODIMENTS

Figure 1:
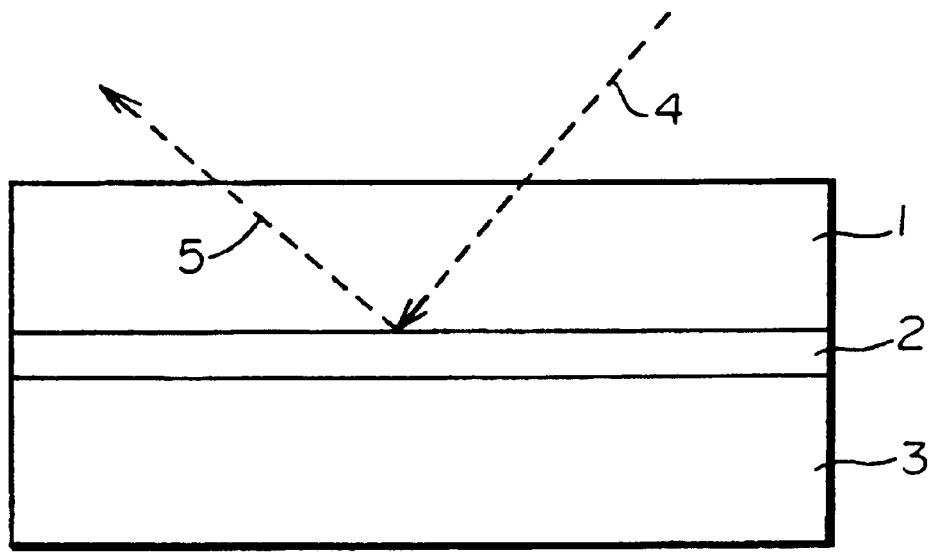
FIG. 1 is a cross-sectional view of a prior art composite film which is improved upon by the present invention.

The wavelengths of light which are to be antireflected in this invention include the wavelength range for most solid state lasers which are currently in use. Typically these layers produce light having a wavelength between 600 and 1200 nm.

The metals which are to be antireflected in accordance with this invention are the gray, low reflectance type metals. Such metals include Ti, Zr, Hf, Cr, Mo, W, Ni, Pd, Pt and alloys thereof. For example, suitable alloys include well known alloys such as nichromes, inconels, and hastelloys. In general the metals which can be antireflected in accordance with this invention have optical constants such that the index of refraction is from 2 to 4 and the extinction coefficient is from 2.5 to 6 at wavelengths of 600–1200 nm.

The above-described metals are deposited in accordance with known procedures currently in use for making metal containing composite film structures with the metal contained within the composite. Exemplitive deposition methods include electron beam evaporation and sputtering. Sputtering is the preferred method for depositing the metal on suitable films such as polymers. Typically such films are applied to a thickness in the range of 3 nm to 60 nm.

The antireflection layer which is $Cu_2O$, $Fe_2O_3$ or SiC is advantageously applied to provide a coating on the metal wherein the coating has an optical thickness of one quarter wavelength with respect to the desired wavelength of the light which is to be antireflected. The above-noted materials are believed to be useful for antireflecting a metal layer within a composite material because they have an index of refraction which is greater than 2.5 and an extinction coefficient which is less than 0.5 at the 600–1200 nm wavelengths.

Coatings which are suitable to antireflect the metal should be able to reduce reflectance to less than 2%, preferably less than 0.5% at the 600–1200 nm wavelengths. It has been discovered that $Fe_2O_3$, SiC and oxides of copper, especially $Cu_2O$, have this unique ability.

The antireflection layer or coating may be formed by any conventional procedure such as sputtering and reactive evaporation. Sputtering is the preferred deposition method for the antireflection coating.

As noted above, the present invention is applicable to a variety of well known thin film composite structures which are designed to interact with laser energy. These composite structures include a metal layer sandwiched between two thin film composite layers, at least one of which is transparent to the laser light so that the laser light can readily pass therethrough and interact with the metal layer within the composite. Thus the invention is applicable to any such well known films which share the above-described composite as a common feature, i.e., they all contain the metal layer in contact on one side thereof with a layer which is transparent to the laser light and another layer which need not be transparent to the laser light on the other side thereof.

The transparent film or coating (transparent media) in contact with the metal in the composite structures of the prior art to which the present invention is applicable is considered to be an optically massive (non-interfering) layer. Typically such layers are applied as a coating. However, the transparent media may also be a film or glass layer adhered by an adhesive.

The transparent layer or media of the composite structures generally have an index of refraction which ranges from about 1.3 to 1.9. Typically the transparent layer is polymeric but glass or other inorganic materials are well known for use as the transparent media in the composite structures to which this invention is applicable. Furthermore, such transparent media used in the well known composite structures to which this invention is applicable may contain additives such as photoconducting dyes, dispersed materials and colorants such as dyes or pigments. Common materials used for the transparent media include acrylate polymer, polycarbonate, polyester and polyurethane.

FIG. 1 depicts the features which are shared by the prior art composite film structures to which the present invention is applicable. Such composites include a transparent film or coating (transparent media) indicated by reference numeral (1) which is adhered to one side of the metal layer (2) and another layer (3) adhered to the other side of metal layer (2). The transparent film or coating (1) and metal (2) are as described above. Layer 3 can be any layer such as the polymers used for coating or film (1). However, since light is intended to enter the structure through the transparent film or coating (1), it is not necessary for layer 3 to be transparent. The term (transparent) is used with reference to the wavelength of the light (e.g., laser light) which is intended for interaction with the metal (i.e., light having a wavelength of 600–1200 nm).

Figure 2:
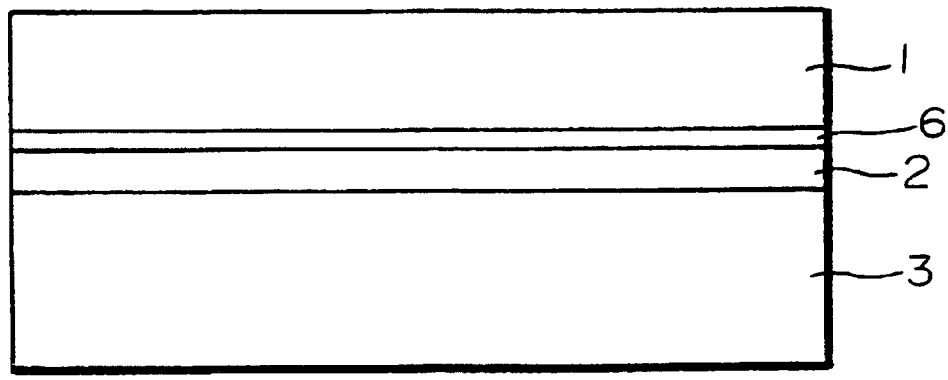
FIG. 2 is a cross-sectional view of the improved composite film of the present invention which includes an antireflecting layer between the transparent film and the internal metal layer.

The problem of reflection associated with the prior art film composites is shown by dashed arrows (4) and (5) in FIG. 1 which depict light passing through the transparent media (arrow 4) and light being reflected from the metal surface (arrow 5). It is reflected light (5) which is undesirable. Thus the present invention employs antireflection layer (6) shown in FIG. 2. Antireflection layer 6 antireflects metal (2) and thereby reduces the amount of light reflected from the metal so that more light which passes first through the transparent film or coating (1) and then through antireflection layer (6), is available for interaction with the metal.

The present invention is particularly suitable for reducing reflection in composite film structures wherein the metal layer is a thin semitransparent layer of titanium. It has been observed that use of a single cuprous oxide layer having a thickness of about 43 nm on a semitransparent 25 nm thick layer of titanium reduces the reflection from the metal to less than 0.5% at an 800 nm wavelength. Thus ink a preferred embodiment the antireflection layer 6 is a single layer of cuprous oxide having a thickness of 43 nm and metal layer (2) is a semitransparent layer of titanium having a thickness of 25 nm.

Cuprous oxide is preferred for use as the antireflection layer because it is easily deposited without substantially increasing the cost of the composite film structure. In particular, cuprous oxide can be easily deposited by sputtering since it has a fairly high sputtering deposition rate. Conventional sputtering procedures are used to deposit the cuprous oxide. For example, the cuprous oxide may be reactively sputtered from a copper target in an oxygen atmosphere. Cuprous oxide is particularly suitable since it has nearly the ideal index of refraction to antireflect a titanium/polymer interface. The ideal index of refraction for this purpose is an index greater than 2.8 where the absorption is 0.0. Cuprous oxide has an index of 2.6 to 2.8 with no absorption in the wavelengths of interest, which is as high as any material known to the inventor.

It is surprising that cuprous oxide is particularly suitable for the present invention since other oxides of copper such as CuO do not work as well as $Cu_2O$ to antireflect the light when used as described herein.

The antireflection layer functions as an interference layer to reduce the reflection. The present invention is particularly advantageous since it can reduce the aforementioned interface reflection to less than 0.5% with only one interference layer being required.

What is claimed is:

1. A film composite which comprises:

a metal layer having first and second surfaces;

an antireflection layer for antireflecting of light, said antireflection layer being coated onto said first surface of said metal layer; and a transparent layer adhered to said antireflection layer whereby said anti-reflection layer is interposed between said metal layer and said transparent layer so that said antireflection layer reduces reflection of said light by said metal layer when said light reaches said metal layer after passing through said transparent layer and said antireflection layer;

with the provisos that said transparent layer is transparent to said light; said metal layer has an optical constant such that said metal has an index of refraction of from 2–4 and an extinction coefficient of from 2.5 to 6 at wavelengths of 600–1200 nm and said antireflection layer has an index of refraction greater than 2.5 and an extinction coefficient which is less than 0.5 at 600–1200 nm wavelengths; and said antireflection layer has an optical thickness of one quarter wavelength with respect to the wavelength of said light which is to be antireflected.

2. The film composite of claim 1 wherein said antireflection layer is a compound selected from the group consisting of oxides of copper, $Fe_2O_3$ and SiC.

3. The film composite of claim 2 wherein said compound is selected from the group consisting of $Cu_2O$, $Fe_2O_3$ and SiC.

4. The film composite of claim 3 wherein said light to be antireflected is laser light having a wavelength of 600–1200 nm, and said transparent layer is an optically massive non-interfering layer with respect to said wavelength.

5. The film composite of claim 4 which further includes a nontransparent or transparent coating on said second surface of said metal layer.

6. The film composite of claim 5 wherein said nontransparent or transparent coating on said second surface of said metal layer is a polymeric film.

7. The film composite of claim 6 wherein said polymeric film is nontransparent.

8. The film composite of claim 7 wherein said transparent layer adhered to said anti-reflection layer is glass or polymeric film.

9. The film composite of claim 8 wherein said transparent layer adhered to said anti-reflection layer is a polymeric film.

10. The film composite of claim 9 wherein said metal of said metal layer is selected from the group consisting of Ti, Zr, Hf, Cr, Mo, W, Ni, Pd, Pt and alloys thereof.

11. The film composite of claim 10 wherein said transparent layer adhered to said antireflection layer has an index of refraction which ranges from about 1.3 to 1.9.

12. The film composite of claim 11, wherein said nontransparent polymeric film and said polymeric film adhered to said antireflection layer are films of polymer selected from the group consisting of acrylate polymer, polycarbonate, polyester and polyurethane.

13. The film composite of claim 11 wherein said antireflection layer is $Cu_2O$.

14. The film composite of claim 12 wherein said antireflection layer is $Cu_2O$.

15. The film composite of claim 13 wherein said metal layer is a semitransparent layer of titanium.

16. The film composite of claim 15 wherein said semitransparent layer of titanium is about 25 nm thick.

17. The film composite of claim 16 wherein said antireflection layer is a single layer of $Cu_2O$ having a thickness of about 43 nm.

18. The film composite of claim 17 wherein said nontransparent polymeric film and said polymeric film adhered to said antireflection layer are films of polymer selected from the group consisting of acrylate polymer, polycarbonate, polyester and polyurethane.

* * * * *